US010860503B2

(12) United States Patent
Isaac et al.

(10) Patent No.: US 10,860,503 B2
(45) Date of Patent: Dec. 8, 2020

(54) VIRTUAL PIPE FOR CONNECTING DEVICES

(71) Applicant: Keyssa Systems, Inc., Campbell, CA (US)

(72) Inventors: Roger Dwain Isaac, San Jose, CA (US); Alan T. Ruberg, Sunnyvale, CA (US); Jeff Cuppett, Los Altos, CA (US); Edward Pak, Saratoga, CA (US)

(73) Assignee: Keyssa Systems, Inc., Campbell, CA (US)

( * ) Notice: Subject to any disclaimer, the term of this patent is extended or adjusted under 35 U.S.C. 154(b) by 36 days.

(21) Appl. No.: 16/402,092

(22) Filed: May 2, 2019

(65) Prior Publication Data

US 2020/0349096 A1 Nov. 5, 2020

(51) Int. Cl.
*G06F 13/00* (2006.01)
*G06F 13/16* (2006.01)
*H04L 1/00* (2006.01)
*G06F 21/72* (2013.01)
*H04B 1/16* (2006.01)
*H04B 1/04* (2006.01)

(52) U.S. Cl.
CPC .......... *G06F 13/1668* (2013.01); *G06F 21/72* (2013.01); *H04L 1/0041* (2013.01); *H04B 1/04* (2013.01); *H04B 1/16* (2013.01)

(58) Field of Classification Search
None
See application file for complete search history.

(56) References Cited

U.S. PATENT DOCUMENTS

| 9,429,992 | B1 * | 8/2016 | Ashenbrenner | G06F 13/4081 |
| 2001/0054131 | A1 * | 12/2001 | Alvarez, II | H04N 19/423 711/105 |
| 2006/0159158 | A1 * | 7/2006 | Moore | H04B 1/7163 375/130 |
| 2007/0016694 | A1 * | 1/2007 | Achler | H03M 7/3088 709/247 |
| 2007/0087771 | A1 * | 4/2007 | Noble | H04B 17/0085 455/522 |

(Continued)

OTHER PUBLICATIONS

IEEE Standard for Telecommunications and Information Exchange Between Systems—LAN/MAN—Specific Requirements—Part 15 : Wireless Medium Access Control (MAC) and Physical Layer (PHY) Specifications for Wireless Personal Area Networks (WPANs), in IEEE Std 802.15.1-2002 , vol., No., pp. 1-473, Jun. 14, 2002.*

*Primary Examiner* — Daniel F. McMahon
(74) *Attorney, Agent, or Firm* — Fenwick & West LLP

(57) ABSTRACT

A universal protocol engine circuit aggregates data of multiple communication ports that may use different communication protocols according to a configurable communication protocol. In a transmitter mode, the universal protocol engine circuit references a slot table defining a sequence of the ports to generate output data from the input data received from the ports, and transmits the output data over a wired or wireless communication link. In a receiver mode, the universal protocol engine circuit references the slot table to parse input data from the communication link into output data for each of the ports. The sequence of ports of the slot table may be configurable according to the speed or other properties of the communication ports.

27 Claims, 12 Drawing Sheets

(56) References Cited

U.S. PATENT DOCUMENTS

| | | | |
|---|---|---|---|
| 2008/0032738 A1* | 2/2008 | Boyer | H04W 88/06 455/556.1 |
| 2008/0075103 A1* | 3/2008 | Noble | H04L 43/50 370/429 |
| 2009/0033359 A1* | 2/2009 | Rofougaran | H03K 19/17732 326/39 |
| 2009/0181663 A1* | 7/2009 | Hu | H04L 49/9031 455/422.1 |
| 2015/0271229 A1* | 9/2015 | Bullotta | H04L 65/60 709/219 |
| 2016/0062924 A1* | 3/2016 | Lee | G06F 1/266 710/14 |
| 2018/0083800 A1* | 3/2018 | McVay | G06F 13/4291 |

\* cited by examiner

FIG. 5

VIRTUAL PIPE FOR CONNECTING DEVICES

BACKGROUND

Electronic devices communicate with each other using ports with different protocol connections. However, too many different protocol connections limit system scalability and increase cost. A large number of protocol connections can result in too many wires, protocols, mechanical connectors, signal integrity problems (e.g., electrostatic discharge, electromagnetic interference, radio-frequency interference, etc.), physical links (PHYs), and/or power consumption. For example, the use of mechanical connectors increases costs and can result in a large number of PHYs, pins, or pads when multiple protocols are used, leading to inefficient data flow management. Furthermore, systems with a large number of protocol connections incur size, power, cost, and fabrication process commitments.

SUMMARY

A universal protocol engine circuit provides a communication link that aggregates multiple communication ports between two devices according to a sequence of ports defined in a slot table. The sequence of ports may define a configurable communication protocol for aggregating ports using different communication protocols. In some embodiments, an electronic device includes a universal protocol engine circuit including a memory, an aggregator circuit, and a transmitter. The memory stores a slot table defining a sequence of ports in which data from one or more communication ports are to be transmitted, each of the communication ports associated with a corresponding communication protocol. The aggregator circuit is coupled to the memory and receives the input data from the one or more communication ports according to the corresponding communication protocol. The aggregator circuit generates output data by selecting the input data from the one or more communication ports according to the sequence of the ports defined in the slot table. The transmitter generates an output stream from the output data and provides the output stream to a wired or wireless coupler for transmission to another electronic device.

In some embodiments, the sequence of ports in the slot table indicates one or more selections of a first port mixed with one or more selections of a second port. The aggregator circuit selects first data from the first port when the slot table indicates selection of the first port and selects second data from the second port when the slot table indicates selection of the second port to generate the output data according to the sequence of ports.

In some embodiments, a first communication protocol associated with a first port of the one or more communication ports is configured for data communication at a higher speed than a second communication protocol associated with a second port of the one or more communication ports. The output data includes first input data of the first port mixed with second input data of the second port according to the sequence of ports.

In some embodiments, a first communication protocol associated with a first port of the one or more communication ports is configured for data communication at a higher speed than a second communication protocol associated with a second port of the one or more communication ports, and the first port has a higher frequency of selection in the sequence of ports than the second port.

In some embodiments, the universal protocol engine circuit further includes a receiver and a parser circuit. The receiver receives an input stream from the wired or wireless coupler and generates other input data from the input stream. The parser circuit is coupled to the memory and the receiver. The parser circuit receives the other input data from the receiver, and generates other output data for each of the one or more communication ports from the other input data according to the sequence of the ports defined in the slot table.

In some embodiments, the sequence of ports in the slot table indicates one or more selections of a first port mixed with one or more selections of a second port. The parser circuit assigns first data to the first port when the slot table indicates selection of the first port and assigns second data to the second port when the slot table indicates selection of the second port to generate the other output data according to the sequence of ports.

In some embodiments, the electronic device includes another universal protocol engine circuit that transfers data through another wired or wireless coupler according another sequence of ports stored in another slot table. The electronic device further includes a configurable crossbar coupled to the one or more communication ports, the universal protocol engine circuit and the other universal protocol engine circuit. The configurable crossbar connects at least one of the one or more communication ports to the universal protocol engine circuit according to the slot table, and connects at least one of the one or more communication ports to the other universal protocol engine circuit according to the other slot table.

In some embodiments, the universal protocol engine circuit operates in a transmitter mode in parallel with the other universal protocol engine circuit operating in a receiver mode.

Some embodiments include a method for data transfer according to a configurable communication protocol. The method includes: storing a slot table defining a sequence of ports in which data from one or more communication ports are to be transmitted, each of the communication ports associated with a corresponding communication protocol; receiving input data from the one or more communication ports according to the corresponding communication protocol; generating output data by selecting the input data from the one or more communication ports according to the sequence of the ports defined in the slot table; generating an output stream from the output data; and providing the output stream to a wired or wireless coupler for transmission to an electronic device.

BRIEF DESCRIPTION OF THE DRAWINGS

FIG. 5 shows a slot table of a VPIO, in accordance with some embodiments.

Figure 1:
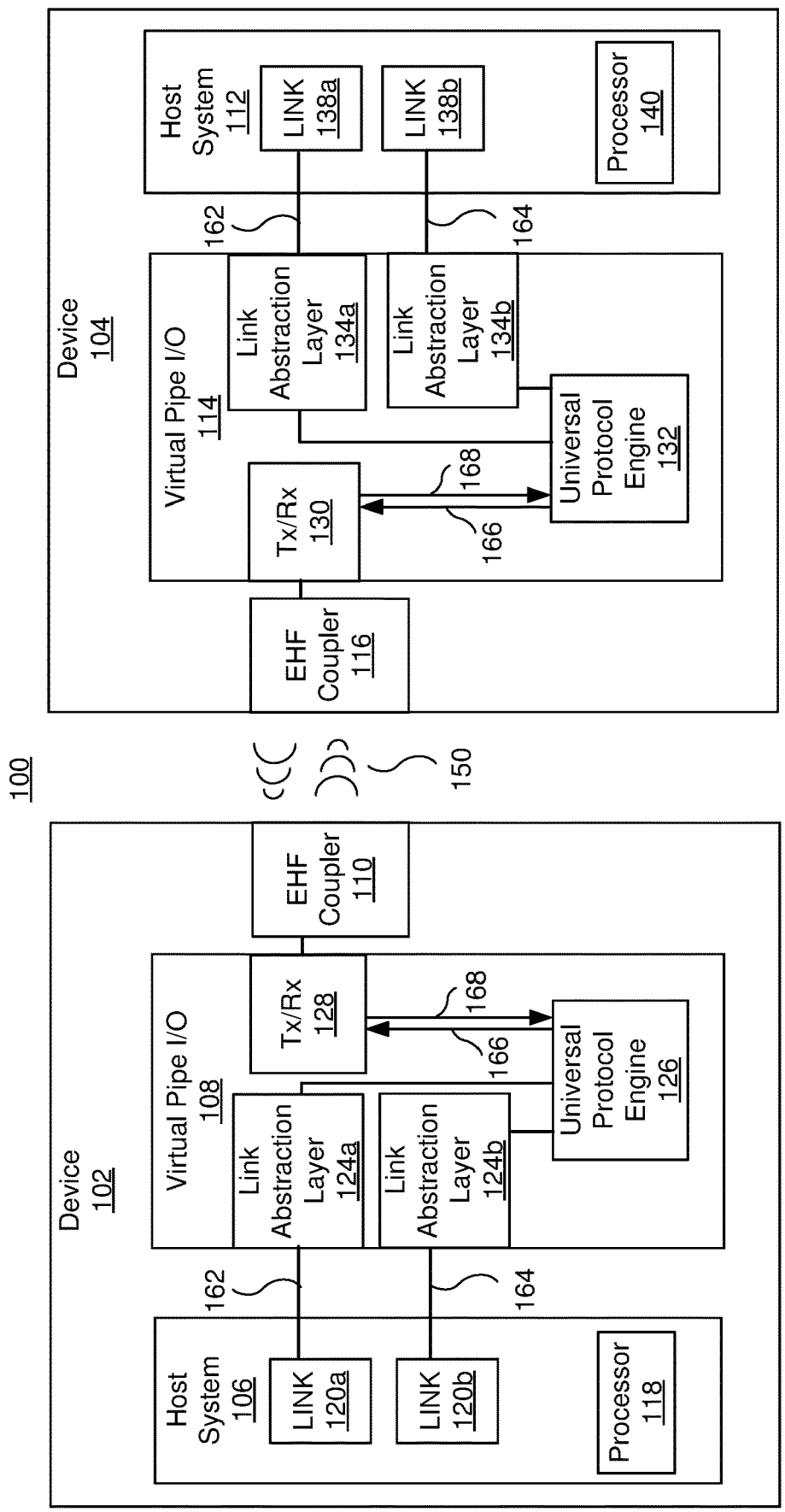
FIG. 1 shows communications between electronic devices, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Configuration Overview

A virtual pipe input/output (VPIO or virtual pipe I/O) includes one or more universal protocol engine (UPE) circuits that facilitate data transfer for multiple communication ports (also referred to as "ports") between two or more devices. Each device may include a virtual pipe I/O, with virtual pipe I/Os providing an interface between multiple ports of coupled devices. Each UPE aggregates data of multiple ports that may use one or more of different communication protocols according to a configurable or "universal" communication protocol, and transfers the aggregated data over a wired or wireless communication link (or "virtual pipe"). VPIO allows a system to aggregate both low-speed and high-speed industry standard and proprietary protocols, for simultaneous transmission using the configurable or universal communications protocol over one or more links. The configurable or universal communication protocol may be defined by a slot table stored in a memory that defines a sequence of ports from which data to be transmitted should be input and to which the received data should be output.

In a transmitter mode, the UPE circuit references the sequence of the ports in the slot table to generate output data according to the communication protocol by selecting the input data from the ports according to the sequence of the ports. In a receiver mode, the UPE circuit references the sequence of ports in the slot table to parse input data from the communication link into output data for each of the ports. The ports may use different communication protocols. The sequence of ports of the universal communication protocol may be configurable according to the speed or other properties of the ports. Among other things, limitations caused by using multiple (e.g., legacy or standard) protocols, physical layers, or mechanical connectors are reduced. The UPE circuit enables the system to maintain OS level compatibility with existing protocols at the device level without the need for new device drivers. The slot table may be programmed prior to data transmission, or may be reprogrammed dynamically during data transmission. The UPE circuit may monitor for changes in the demands of the application or transferred data, and update the slot table accordingly. For example, additional slots of a slot table may be allocated to a port used for video transfer if a higher resolution video is transferred through the port. In another example, the slots of a slot table allocated to a port may decrease if bandwidth need is decreased.

Furthermore, a virtual pipe I/O may include multiple UPE circuits for multiple communication links between devices. Each UPE circuit may be connected to the ports by a configurable crossbar according to the slot table. Each UPE circuit may use a different slot table to facilitate data transfers according to a communication protocol. Different UPE circuits may operate in parallel in different modes, such as the transmitter or receiver modes, to transfer data between devices. Different UPE circuits may also be assigned different ports according to the slots tables. Multiple UPE circuits may be used to increase the bandwidth of the data transfer between devices.

FIG. 1 shows a system 100 including electronic devices 102 and 104 that communicate with each other, in accordance with some embodiments. The device 102 includes a host system 106, a virtual pipe I/O 108, and an extremely high frequency (EHF) coupler 110. The device 104 includes a host system 112, a virtual pipe I/O 114, and an EHF coupler 116.

The host system 106 is coupled to the virtual pipe I/O 108, and the virtual pipe I/O 108 is coupled to the EHF coupler 110. The virtual pipe I/O is an integrated circuit that is separate from the host system 106 and EHF coupler 100. The host system 106 includes a processor 118 and multiple data link layers (LINKs) 120 (including LINK 120a and 120b). In some embodiments, the processor 118 and LINKs 120 are connected via a circuit board that provides communications between these components, and the virtual pipe I/O 108 is on another circuit board. In this standalone configuration, the virtual pipe I/O 108 can be integrated with various types of host systems 106 without requiring modifications in the host system 106. Each LINK 120 is a circuit that encodes bits into packets prior to transmission and decodes received packets back into bits; may provide reliable data transfer by transmitting packets with the necessary synchronization, error control and flow control; and may provide for logical link control, media access control, hardware addressing, error detection and interfacing with the PHY. Each LINK 120 may be divided into sublayers including but not limited to the media access control (MAC) sublayer and the logical link control (LLC) sublayer. Each LINK 120 may be a protocol layer (e.g., layer 2) of the Open Systems Interconnection (OSI) model.

Each LINK 120 implements a port of the host system 106 for external communication. For example, the LINK 120a provides a port 162, and the LINK 120b provides another port 164. Although two ports 162, 164 are shown for simplicity, the host system 106 may include various numbers of ports. The ports may include ports for external communication where host system 106 is not in the same package as virtual pipe I/O 108, or internal communication where host system 106 and virtual pipe I/O 108 share the same package. The processor 118 may be coupled to each of the LINKs 120 to communicate via the ports. Different ports may use different protocols, including high-speed protocols and low-speed protocols. In some embodiments, one or more LINKs 120 may be integrated with the processor 118 (e.g., as a driver).

The virtual pipe I/O 108 is a circuit that provides for data transfer between the host system 106 and the virtual pipe I/O 114 of the device 104. The virtual pipe I/O 108 may operate in a transmitter mode, a receiver mode, or a transceiver mode. In the transmitter mode, the virtual pipe I/O 108 provides for aggregation of data from the ports 162, 164 of the host system 106 for transmission via the EHF coupler 110, or a wired connection. In the receiver mode, the virtual pipe I/O 108 parses data from the EHF coupler 110 for transmission to the host system 106 via the ports 162, 164. In the transceiver mode, the virtual pipe I/O 108 operates as a transmitter and a receiver simultaneously. For example, one or more ports may be dedicated to transmitting while one or more other ports may be dedicated to receiving.

The virtual pipe I/O 108 includes link abstraction layers 124 (including link abstraction layers 124a and 124b), a universal protocol engine (UPE) 126, and a transceiver (Tx/Rx) 128. The virtual pipe I/O 108 is coupled to the links 120 of the host system 106 via the link abstraction layers 124 of the virtual pipe I/O 108. Each LINK 120 of the host system 106 is coupled to a corresponding link abstraction layer 124 of the virtual pipe I/O 108 to connect a port to the UPE 126. Each link abstraction layer 124 may be adapted to communicate with the host system 106 via a transmission medium, such as a cable, suitable for the protocol of the port 162, 164.

In some embodiments, each link abstraction layer 124 includes a physical layer (or PHY) that provides an electrical interface for connection to a LINK 120 via a transmission medium (e.g., a cable); defines physical characteristics such as connections, voltage levels and timing; and defines the means of transmitting raw bits rather than logical data packets over a physical link. The bit stream may be grouped into code words or symbols and converted to a physical signal that is transmitted over the transmission medium. Each link abstraction layer 124 may include a standards-based PHY that incorporates PHY specifications of one or more standard protocols. Examples of standard protocols may include Universal Serial Bus (USB), DisplayPort, I2C, GPIO, PCIe 3, PCIe sideband, MIPI, or Next Gen Camera Protocol. Each PHY may be a physical layer (e.g., layer 1) of the Open System Interconnection (OSI) model.

The UPE 126 is a circuit that controls the operation of the virtual pipe I/O 108. The UPE 126 is connected to multiple ports 162, 164 of the host system 106 via the link abstraction layers 124. In the transmitter mode, the UPE 126 receives input data from each of the ports 162, 164 and aggregates the input data to generate output data 166. In particular, the UPE 126 generates the output data 166 based on selecting the input data from the ports 162, 164 according to a sequence of the ports as defined in a slot table (shown in FIG. 5), as will be explained in further detail below and also with reference to FIG. 5. The aggregated output data 166 is provided to the transceiver 128 for transmission by the EHF coupler 110 via a communication link 150. In the receiver mode, the UPE 126 receives input data 168 from the transceiver 128, and parses the input data 168 according to the sequence of the ports defined in the slot table (shown in FIG. 5) to generate output data for each of the ports 162, 164, as will be explained in further detail below and also with reference to FIG. 5. The input data 168 is transmitted via respective ports to the host system 106 via the link abstraction layers 124 and LINKs 120. The input data 166 and output data 168 are shown as being transmitted via separate connections in FIG. 1 to illustrate bi-directional data transfer, but in some embodiments the input data 166 and output data 168 may be transmitted using the same connection.

The sequence of ports in the slot table defines a universal communication protocol shared by the devices 102 and 104 for aggregating and parsing data transmitted through the virtual pipe I/Os 108 and 114. The universal communication protocol integrates data from multiple ports that may use different (e.g., standard) communication protocols. In some embodiments, the UPE 126 performs additional processing of data that uses the universal communication protocol, such as applying encryption, decryption, authentication, and/or error correction, for example. The UPE 126 may define the sequence of ports in the slot table based on the bandwidth demand of applications or transferred data, and may dynamically adjust (e.g., during data transfer) the sequence of ports in the slot table in response to changes in bandwidth demand. The processing for the universal communication protocol is not limited to predefined operations associated with standard communication protocols of the ports. Additional details regarding the operation of the UPE 126 are discussed in connection with FIGS. 4 through 12.

The transceiver 128 transfers data between the EHF coupler 110 and the UPE 126. The transceiver 128 may include a transmitter with a serializer, and a receiver with a deserializer. When operating as a transmitter, the serializer converts parallel streams of output data 166 from the UPE 126 into a serial stream of output data that is transmitted to the EHF coupler 110 for wireless transmission through the communication link 150 (e.g., including air as transmission medium). When operating as a receiver, the deserializer converts a serial input stream from the EHF coupler 110 into parallel streams of input data 168 which is transmitted to the UPE 126. In some embodiments, the virtual pipe I/O 108 may include a separate transmitter and receiver.

The EHF coupler 110 (in connection with the EHF coupler 116) provides a wireless communication link between the virtual pipe I/O 108 of the device 102 and the virtual pipe I/O 114 of the device 104. The EHF coupler 110 is an EHF communication device that includes an antenna for wireless transmissions. The antenna may be configured to operate in an EHF spectrum (30 GHz to 300 GHz), and may be configured to transmit and/or receive electromagnetic signals through the communication link 150. In some embodiments, the EHF coupler 110 performs modulation of transmitted data with a carrier signal and demodulation of a received signal to generate received data. In some embodiments, the device 102 is coupled to the device 104 via a wired communication link, and the EHF couplers 110 and 116 may be replaced with wired connectors.

The discussion regarding the device 102 may be applicable to the device 104. For example, the virtual pipe I/O 114 may operate like the virtual pipe I/O 108 in the transmitter, receiver modes, or transceiver modes. When the virtual pipe I/O 108 operates in the transmitter mode, the virtual pipe I/O 114 operates in the receiver mode. Similarly, virtual pipe I/O 108 operates in the receiver mode when the virtual pipe I/O 114 operates in the transmitter mode. As such, the virtual pipe I/O 114 includes a transceiver 130 coupled to the EHF coupler 116, and a UPE 132 coupled to multiple link abstraction layers 134 (including link abstraction layer 134a and link abstraction layer 134b). Each link abstraction layer 134 is coupled to a LINK 138 of the host system 112. The host system 112 includes the LINKs 138 (such as LINKS 138a and 138b) to provide a port 162, 164, and a processor 140. The virtual pipe I/Os 108 and 114 provide a communication link between the host systems 106 and 112 that aggregates multiple ports into a universal communication protocol.

Figure 2:
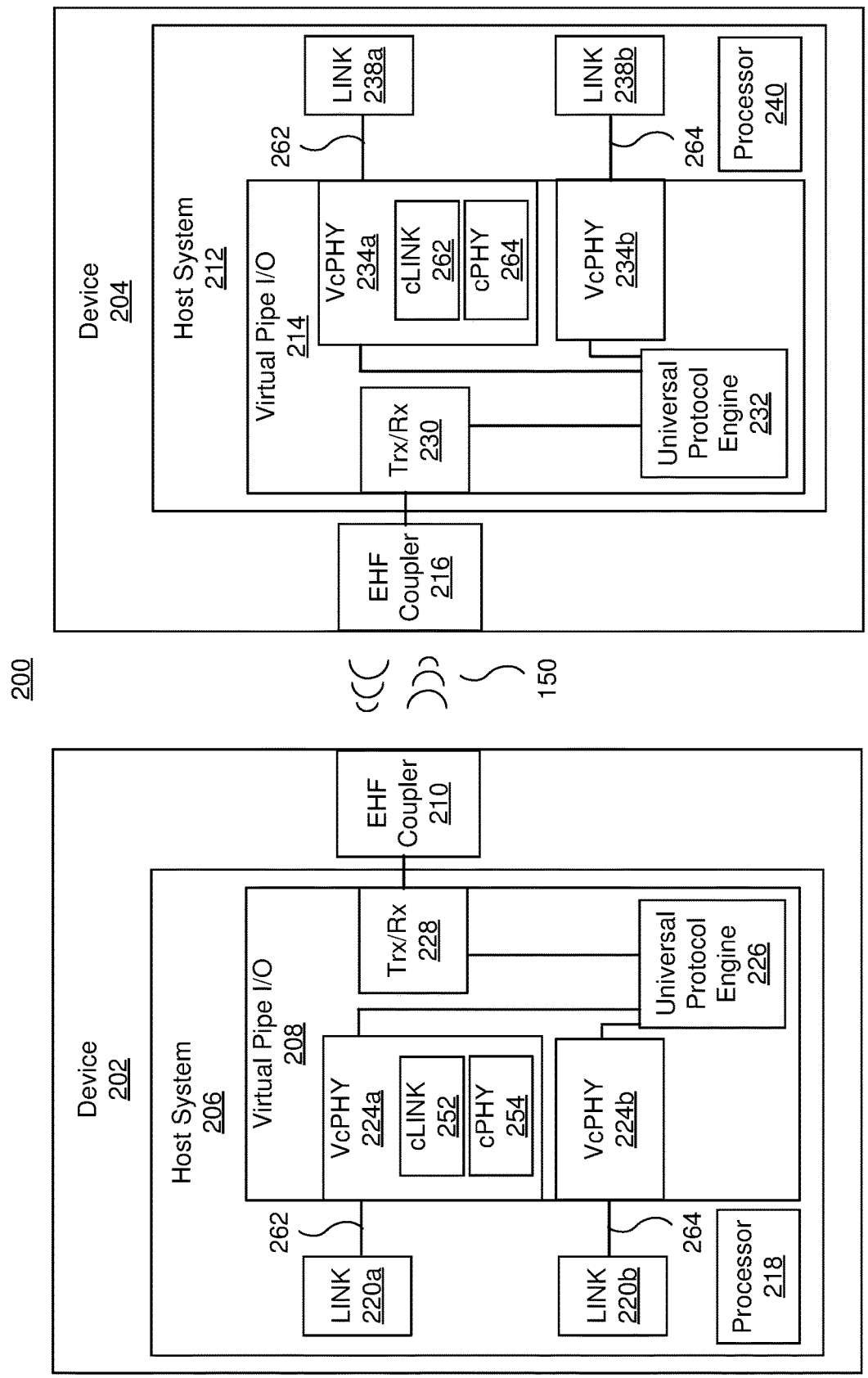
FIG. 2 shows communications between electronic devices, in accordance with some embodiments.

FIG. 2 shows a system 200 including electronic devices 202 and 204 that communicate with each other, in accordance with some embodiments. Unlike the devices 102 and 104 shown in FIG. 1, the devices 202 and 204 each includes a virtual pipe I/O that is integrated with the host system 206 or some other integrated system of the device. Here, the virtual pipe I/O may be an integrated logical component of the host system, such as a subsystem of the host system.

The device 202 includes a host system 206 that includes a processor 218, LINKs 220 (including LINK 220a and LINK 220b), a virtual pipe I/O 208, and an EHF coupler 210. The devices 202 and 204 are different from the devices 102 and 104 shown in FIG. 1 in that the virtual pipe I/Os 208, 214 are integrated with the host systems 206, 212, respectively. For example, the virtual pipe I/O 208 may be integrated on the same circuit board as the processor 218, LINKs 220 and other components of the host system 206.

For each port and LINK 220, the virtual pipe I/O 208 includes a virtual contactless PHY (VcPHY) 224. Each VcPHY 224 is an instance of a link abstraction layer. Each VcPHY 224 includes a contactless link layer (cLINK) 252, and a contactless PHY (cPHY) 254, as shown for the VcPHY 224a. Although not shown for the VcPHY 224b for simplicity, each VcPHY 224 may include a cLINK 252 and a cPHY 254.

It may be advantageous to have a universal physical interface to enable a host system to seamlessly communicate with another host system through an EHF contactless link, or some other type of link. The host system may intend to communicate using any one (or more) of available Standards-based protocols or through a protocol optimized for EHF communication. However, each of these protocols would require a unique LINK 120 implementation that corresponds to the protocol's specifications (e.g., as shown in FIG. 1). The burden of implementing a Standards-based protocol specification for an electrical interface to a virtual pipe I/O that in turn communicates with a partner virtual pipe I/O using electromagnetic signaling may impose undue constraints on both the design of the host system and the virtual pipe I/O itself. These constraints may include additional PHYs, pins, electrical signals, and die area. This issue is exacerbated if the host system has to communicate using more than one of the Standards-based protocols.

The VcPHY 224 may translate the Standards-based LINK 220 specifications to a cLINK 252 and cPHY 254 specifications to enable seamless and reliable transfer of data across a contactless link. The VcPHY 224a/234a may provide a seamless interface to the LINK 220a/238a that may be substantially compliant with one or more of the Standards' specifications.

The LINK 220a/238a may communicate with the VcPHY 224a/234a as though the VcPHY is a PHY implementation from a corresponding Standards' specification. For example, if the LINK 220a/238a is a DisplayPort LINK, then the LINK may interface with the VcPHY 224a/234a using a substantially similar interface to a DisplayPort PHY.

The LINKs 220a/238a and cLINKs 252/262 may incorporate independent training sessions. The LINKs 220a/238a training may be directed towards the end-to-end (or between host systems 206/212) link and the cLINKs 252/262 may direct their training towards the contactless communication link (or "contactless link") 150 through the virtual pipe I/Os 208/214.

Several attributes of the VcPHY 224 may enable the Standards-based LINKs 220 to be interfaced to the VcPHY 224, thus "virtualizing" the PHY implementation in the host system 206 to the Standards-based LINK and higher layers (layers above the LINK 220, also referred to as "upper" layers).

The terms "virtual," "virtualizing," or "seamless" refers to parts of the system or device that may not be affected by one or more of the other functional layers or blocks.

In some embodiments, a cLINK 252/262 within the VcPHY 224a/234a may enable, control and provide various functionalities related to contactless links, including (but not limited to): ensuring that an initial connection between contactless devices has been set up, including training of the link; dividing data output by the transceiver (SerDes) into data frames; or handling acknowledgements from a cPHY 254 receiver that the data arrived successfully, ensuring that incoming data from a partner/companion device has been received successfully, such as by analyzing bit patterns within the frames.

The cLINK 252 may also incorporate functions that are directed towards enabling the virtual pipe I/O to communicate data and control/management data with one or more of other virtual pipe I/Os. These functions may include one or more of the following: discovering, configuring and maintenance functions that are directed towards enabling and maintaining a contactless link across multiple virtual pipe I/Os. One or more functions including that of polling, beaconing, security verification functions may be implemented in the virtual pipe I/O 208. These functions may be directed towards the contactless communication by the virtual pipe I/O 208 with another virtual pipe I/O 214. The cLINK 252 may also incorporate functions that are directed to one or more of the electrical interface(s) between the host system 206 and the virtual pipe I/O 208, and/or the contactless communication by the virtual pipe I/O 208 with another virtual pipe I/O 214. By substantially moving the LINK functions of both of these interfaces to a single cLINK 252 in the VcPHY 224a in the host system 206, the complexity of other components can be substantially reduced, with the transceiver 228 including analog functionality to enable EHF contactless communication. For example, any of the discovering, configuring and maintenance functions in the virtual pipe I/O 108 shown in FIG. 1 may be moved to the cLINK 252 which is integrated with the host system 206. Therefore, the cLINK 252 in the VcPHY 224a can be used for discovering, configuring and maintenance functions directed towards either one or both of the electrical interface between the LINKs 220 of the host system 206 and the virtual pipe I/O 208, and between the contactless link 150 of the virtual pipe I/O 208 with a partner virtual pipe I/O 214.

A device's software or application layers that communicate with the LINK 220 may not be "aware" of the presence of a VcPHY 224 that is inherently different from a Standards compliant PHY; however, the VcPHY has a Standards compliant PHY. For example, a device's software or application layers may not be aware of the EHF contactless link 150. Not being "aware" means that the functioning of the relevant layers or blocks in the higher layers may be independent of the underlying physical layer. Moreover, since the VcPHY 224a has embedded LINK (or cLINK) functionality incorporated therein, the function of the cLINK layer may be simplified. An advantage offered by implementing a Standards-based LINK connected to a VcPHY is that the host system's upper layer(s) may need minimal or no update. This is possible since existing driver software in the OS Kernel and in the system (that has been designed for the LINK 220) can be reused for communication over the VcPHY and the virtual pipe I/O. This advantage facilitates adoption of integrated virtual pipe I/Os into various systems without the need for making substantial changes in the protocol or software stacks of existing host systems. This enables the system to maintain OS level compatibility with existing protocols at the device level without the need for new device drivers. The LINK 220 may be implemented or virtualized as a software layer and a number of virtualized LINKs may interface to one or more physical VcPHYs through a software interface.

The VcPHYs 224 are coupled to the UPE 226 to connect ports 262, 264 to the UPE 226. The UPE 226 controls the operations of the virtual pipe I/O 208 including aggregating and parsing of data. The UPE 206 is coupled to the EHF coupler 210 via transceiver 228, which connects the device 202 to the EHF coupler 216 of the device 204 via the communication link 150. In some embodiments, a wired connection is used between the virtual pipe I/Os 208 and 214 rather than the EHF couplers 210, 216.

The discussion regarding the device 202 is applicable to the device 204. For example, the device 204 includes a host system 212 including a virtual pipe I/O 214, LINKs 238 (including LINK 238a and LINK 238b), and a processor 240. The virtual pipe I/O 214 includes VcPHYs 234 (including VcPHY 234a and VcPHY 234b), which are coupled to a UPE 232. Each VcPHY 234 may include a cLINK and cPHY, as shown by the cLINK 262 and cPHY 264 of the VcPHY 234a. The UPE 232 is coupled to the EHF coupler 216 via the transceiver 230.

Figure 3:
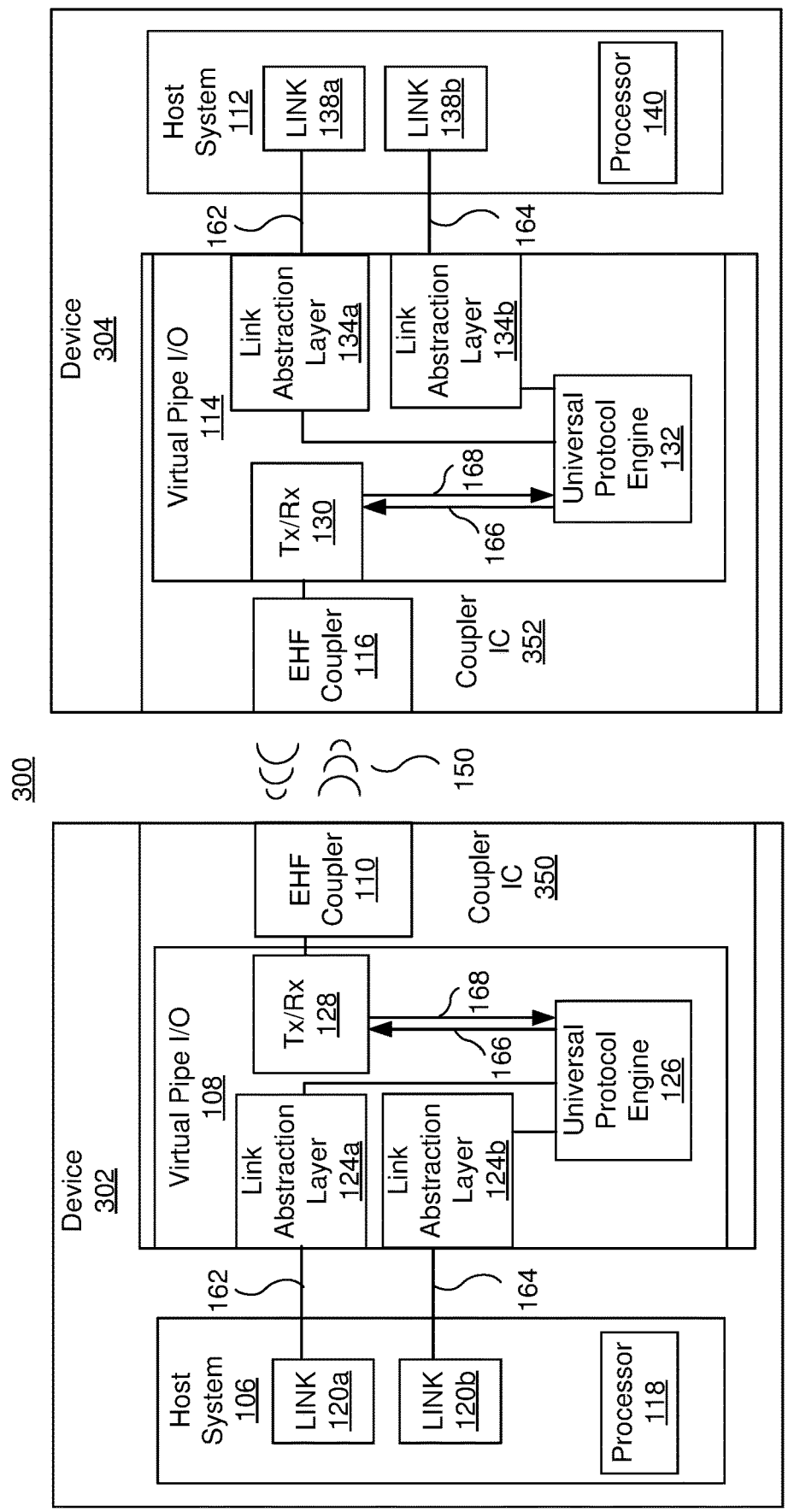
FIG. 3 shows communications between electronic devices, in accordance with some embodiments.

FIG. 3 shows a system 300 including electronic devices 302 and 304 that communicate with each other in accordance with some embodiments. The discussion of the electronic devices 102 and 104 in FIG. 1 may be applicable to the electronic devices 302 and 304, except that the virtual pipe I/Os of each device are integrated with the EHF coupler, such as on a coupler integrated circuit (IC). Each coupler IC is connected to a host system, and may include a circuit board that is separate from the connected host system.

For example, the device 302 includes a coupler IC 350 that includes the virtual pipe I/O 108 and the EHF coupler 110. The coupler IC 350 is connected to the host system 106. The device 304 includes a coupler IC 352 that includes the virtual pipe I/O 114 and the EHF coupler 116. The coupler IC 352 is connected to the host system 112.

Figure 4:
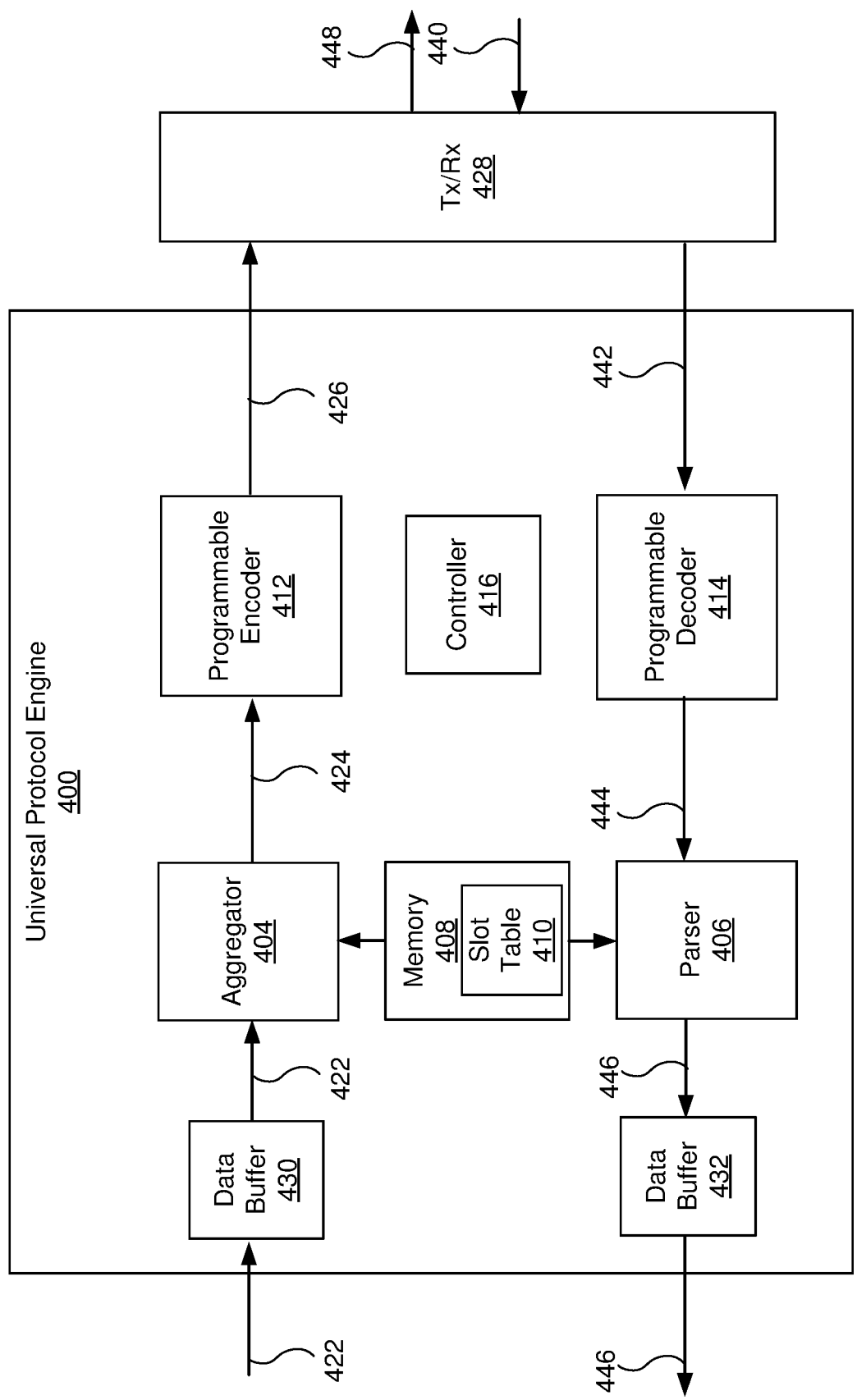
FIG. 4 shows a universal protocol engine (UPE) of a virtual pipe input/output (VPIO), in accordance with some embodiments.

FIG. 4 shows a universal protocol engine (UPE) 400 of a virtual pipe I/O, in accordance with some embodiments. The UPE 400 is an example of the UPE 126/132 of the virtual pipe I/Os 108/114 that is standalone as shown in FIG. 1, a UPE 226/232 of the virtual pipe I/Os 208/214 that is integrated with the host system as shown in FIG. 2, or a UPE 126/132 of the virtual pipe I/Os 108/144 that is integrated with a coupler IC including a coupler as shown in FIG. 3. The UPE 400 is coupled to a transceiver 428. The UPE 400 includes an aggregator 404, a parser 406, a memory 408 that stores a slot table 410, a programmable encoder 412, a programmable decoder 414, a controller 416, a data buffer 430, and a data buffer 432.

In the transmitter mode, the aggregator 404 and programmable encoder 412 are activated to transfer data from the ports to the transceiver 428, which operates as a transmitter. The data buffer 430 is coupled to multiple ports, such as the ports 162, 164 via the link abstraction layers 124/134 as shown in FIG. 1 for the UPE 126/132, or via the ports 262, 264 via the VcPHYs 224/234 as shown in FIG. 2 for the UPE 226/232, or via the ports 162, 164 via the link abstraction layers 124/134 as shown in FIG. 3 for the UPE 126/132. The aggregator 404 is coupled to the data buffer 430 and the memory 408. The memory 408 stores the slot table 410 that defines a sequence of the ports. The data buffer 430 receives input data 422 from the multiple ports, and stores the input data 422. In some embodiments, the data buffer 430 includes a first-in first-out (FIFO) memory for each port that stores input data 422 received from the ports. The aggregator 404 selects and aggregates the input data 422 from the FIFO memories of the data buffer 430 according to the sequence defined in the slot table 410 to generate output data 424.

The programmable encoder 412 receives the output data 424 from the aggregator 404 and performs an encoding or other processing to generate output data 426. In some embodiments, the programmable encoder 412 performs authentication and/or error correction. In some embodiments, the programmable encoder 412 may be bypassed, deactivated, or omitted from the UPE 402.

The transceiver 428 receives the output data 426 and generates an output stream 426 for an EHF coupler or other communication component, such as a wired connector. The transceiver 428 may include a serializer that converts parallel streams of the output data 426 into a serial output stream 448 that is transmitted by the EHF coupler or other communication component.

In the receiver mode, the parser 406 and programmable decoder 414 are activated to transfer data from the transceiver 428, which operates as a receiver, to the ports. The data buffer 432 is coupled to multiple ports, such as via the link abstraction layers 124/134 as shown in FIG. 1 for the UPE 126/132, or via the VcPHYs 224/234 as shown in FIG. 2 for the UPE 226/232, or via the link abstraction layers 124/134 as shown in FIG. 3 for the UPE 126/132. The data buffer 432 is coupled to the parser 406. The parser 406 and the aggregator 404 may be coupled to the same ports to provide bi-directional communication between the ports and transceiver 428. In some embodiments, the UPE 400 includes a single data buffer that performs the functionality of the data buffers 430 and 432. The parser 406 is further coupled to the memory 408 that stores the slot table 410 defining the sequence of the ports.

The transceiver 428 receives an input stream 440 from an EHF coupler or a wired connector, and generates input data 442. The transceiver 428 may include a deserializer that converts the serial input stream 440 into parallel streams of the input data 442.

The programmable decoder 414 receives the input data 442 from the transceiver 428 and performs decoding or other processing to generate input data 444. For example, the input data 442 may be generated by another UPE of another virtual pipe I/O that applies an encoding algorithm in the transmitter mode prior to transmission, and the programmable decoder 414 may decode the received input data 442 by applying a corresponding decoding algorithm. In some embodiments, the programmable decoder 414 performs authentication and/or error correction. In some embodiments, the programmable decoder 414 may be bypassed, deactivated, or omitted from the UPE 400.

The parser 406 receives input data 444 from the programmable decoder 414, and generates output data 446 by parsing the input data 444 according to the sequence of ports defined in the slot table 410. The output data 446 is stored in the data buffer 432, which provides the output data 446 to respective ports. In some embodiments, the data buffer 432 includes a FIFO memory for each port that stores the output data 446 that is provided to the ports.

The controller 416 controls the operation of the UPE 400. For example, the controller 416 may control the mode of operation including switching between the transmitter, receiver, or transceiver modes. The controller 416 may also configure the sequence of ports defined in the slot table 410. In some embodiments, the controller 416 provides power management for the UPE 400, such as handling transitions in and out of standby mode. In some embodiments, the controller 416 controls operation of the UPE 400 between a start-up mode and a mission mode. In the start-up mode, the operation of the UPE 400 of a device changes between the transmitter mode and the receiver mode based on instructions from the other connected device for the purpose of initialization. In the mission mode, the UPE 400 may operate mostly in the receiver mode (e.g., for high-speed data transmission such as video data), with operation switching periodically to the transmitter mode (e.g., for low-speed data transmission such as for I2C traffic, GPIO data, etc.).

In the transceiver mode, the UPE 400 transmits and receives data. The data buffer 430, aggregator 404, programmable encoder 412, and transceiver 428 operate to provide the transmitting of data. The transceiver 428, programmable decoder 414, parser 406, and data buffer 432 operate to provide the receiving of data. The UPE 400 may use different slot tables 410 for receiving and transmitting, or a common slot table 410 for receiving and transmitting. As such, the memory 408 may store one or more slot tables. The sequence of ports for receiving and transmitting may be different, or may be the same.

Figure 5:
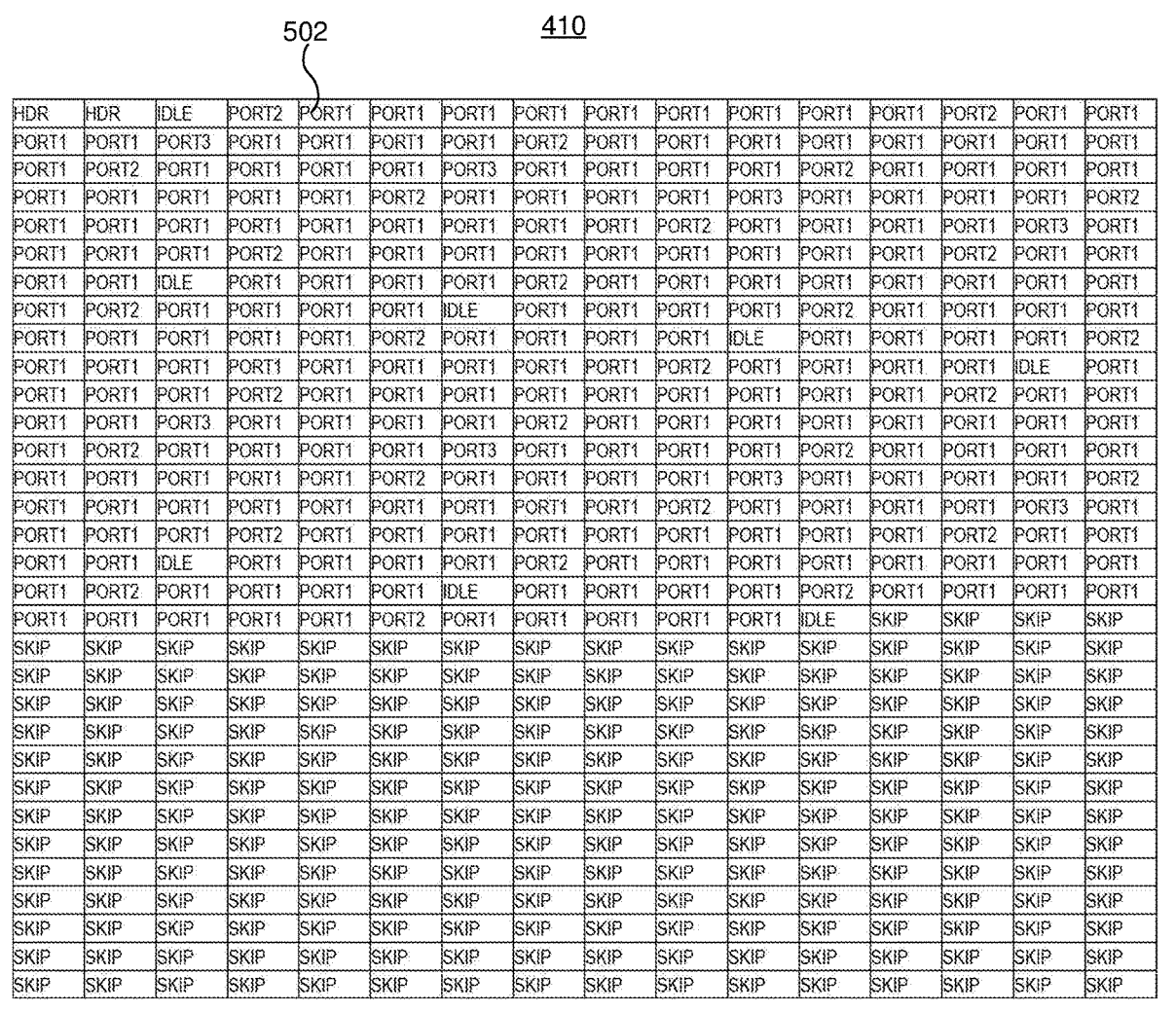

FIG. 5 shows a slot table 410 of a universal protocol engine, in accordance with some embodiments. The slot table 410 includes a sequence of slots 502, each slot 502 corresponding with a particular port. The slot table 410 defines a universal communication protocol that aggregates data of multiple ports using multiple (e.g., standard) protocols. In one embodiment, the first slot is defined at the top left corner of the slot table, and subsequent slots are defined in a raster-like scanning pattern from left to right for each row, and top to bottom for subsequent rows, although the order of the slots can be defined otherwise in the slot table 410. The HDR slots of the slot table 410 indicate the beginning of the slot table 410. The IDLE slots are used for link monitoring traffic and block cyclic redundancy check (CRC). The SKIP slots are unused slots that may be assigned a port or other traffic. The ports shown in the slot table 410 include PORT1, PORT2, and PORT3.

In some embodiments, the slot table 410 is (e.g., software) programmable. The slots 502 of the slot table 410 may be allocated at the beginning of a data transfer, or may be updated dynamically during a data transfer such as based on user control, change in system demand, change in traffic (e.g., video resolution may be changed to a higher or lower resolution, resulting in a change in bandwidth demand), or some other reason. There may be multiple slot tables in each universal protocol engine. One primary slot table be used for active transmission of data, one primary slot table may be used for active reception of data, and in other cases, this slot primary table may be shared between transmission and reception of data. There may be additional slot tables that contain one or more of the following: (1) a default slot table for use during initialization and (2) one or more secondary slot tables that may be programmed in the background while the primary slot table is in use. The secondary slot tables may be swapped with the primary slot table at predefined, programmable boundaries, to enable seem-less transmission from one slot table configuration to a second slot table configuration.

In the transmitter mode, the aggregator 404 references the slot table 410 to select input data 422 from the ports according the sequence defined in the slot table 410 to generate the output data 424. Referring to the first two rows of the slot table 410 after the two HDR slots and the IDLE slot, first, the PORT2 is selected, and then PORT1 is selected for in the next eight slots, and then PORT2 is selected, then PORT1 is selected for the next four slots, then PORT3 is selected, and so forth. In the receiver mode, the parser 406 references the slot table 410 to parse input data 444 into multiple channels of output data 446 for the ports. For example, the input data 444 is transmitted to PORT2 according to the first slot, then PORT1 according to the next eight slots, then PORT2, then PORT1 according to the next four slots, then PORT3, and so forth. In the transceiver mode, there is both transmitting and receiving of data through the ports. In some embodiments, the transmitting and receiving may use different ports, or different slot tables. Certain ports may be assigned to transmitting data while other ports may be assigned to receiving data.

In some embodiments, the slots 502 of the slot table 410 are scheduled according to the speed of the ports. For example, the PORT1 may be a high-speed port while the PORT3 may be a low-speed port. As such, the PORT1 is scheduled in the slots 502 at a higher frequency than the PORT3. In some embodiments, the ports are scheduled into the slots 502 of the slot table 410 according to relative speeds of the ports, with higher speed ports being scheduled in more slots than lower speed ports.

Modular Virtual Pipe I/O

Multiple UPEs may be connected by a configurable crossbar to provide multiple communication links between devices. Multiple communication links increase the bandwidth of communication between devices. Different UPEs may operate in parallel and in different modes (e.g., transmitter, receiver, or transceiver). Each communication link is controlled by a UPE that can selectively integrate multiple ports with different speeds and protocols into a universal protocol as defined by one or more slot tables of the UPE.

Figure 6:
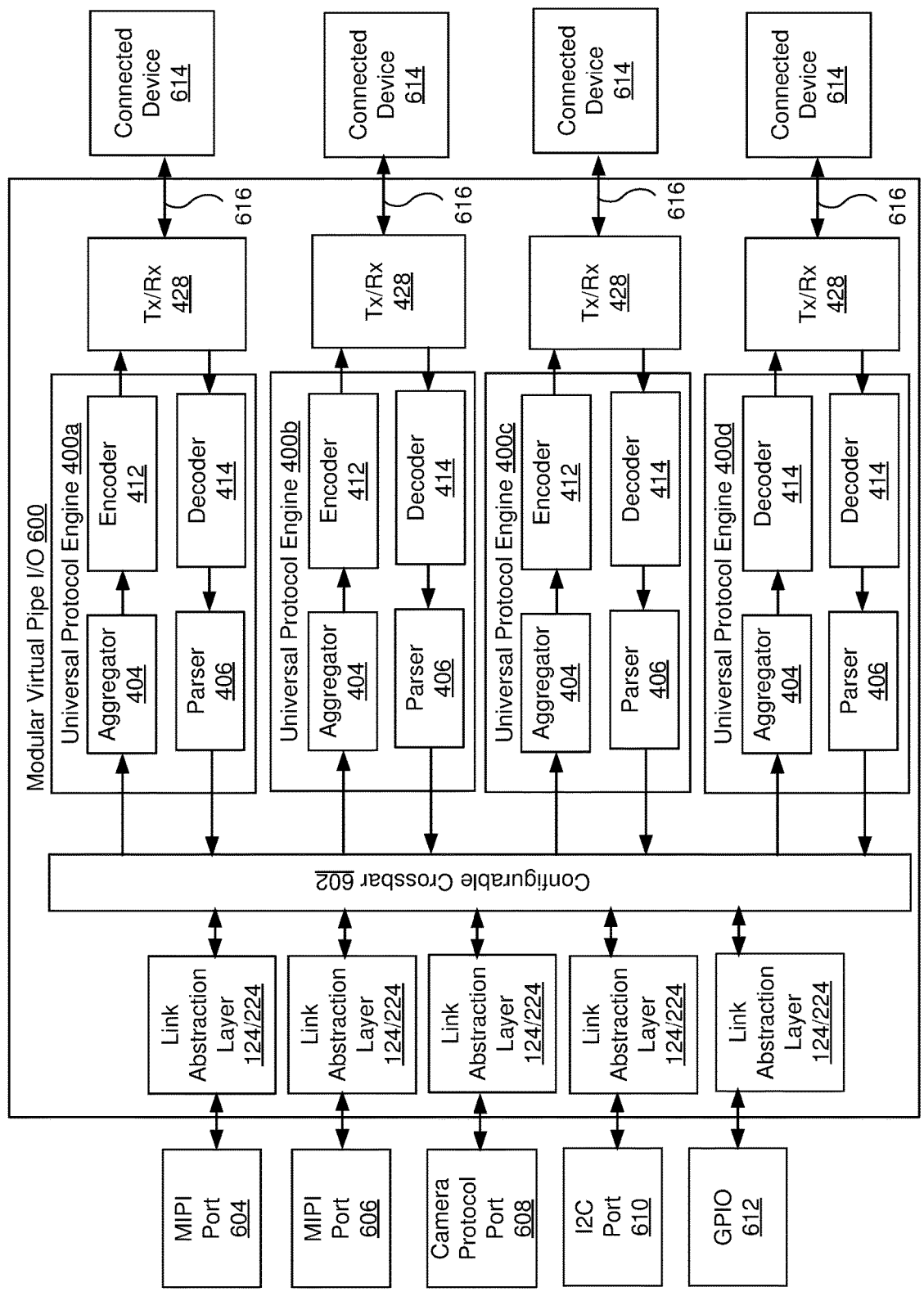
FIGS. 6, 7, and 8 show modular VPIO, in accordance with some embodiments.

FIG. 6 shows a modular virtual pipe I/O 600, in accordance with some embodiments. The modular virtual pipe I/O 600 includes multiple UPEs 400a through 400d that are coupled to ports 604, 606, 608, 610, and 612 via a configurable crossbar 602. The configurable crossbar 602 is coupled to the link abstraction layers 124/224, with each link abstraction layer 124/224 connected to a different port 604, 606, 608, 610, and 612. The modular virtual pipe I/O 600 may be standalone, integrated with a host system, or integrated with a coupler IC. Although not shown for simplicity, each UPE 400 may include the memory 408 storing the slot table 410, the controller 416, and other components as shown FIG. 4. In some embodiments, multiple UPEs 400 of the modular virtual pipe I/O 600 share a controller 416 that controls the operations of the UPEs 400.

Each of the UPEs 400 is connected to a connected device 614 via a communication link 616. A communication link 616 may be a wired or wireless (e.g., EHF) connection. In some embodiments, the modular virtual pipe I/O 600 is connected to a single device 614 via multiple communication links 616.

Each UPE 400 may selectively operate in the transmitter, receiver, or transceiver modes. In the transmitter mode of a UPE 400, the configurable crossbar 602 connects one or more of the ports 604 through 612 to the UPE 400 according to a slot table of the UPE 400. For example, the UPE 400a may store the slot table 410 shown in FIG. 5, with the port 604 corresponding with PORT1 in the slot table 410, the port 606 corresponding with PORT2, the port 608 corresponding with PORT3, and so forth. As such, the configurable crossbar 602 connects the ports 604, 606, and 608 to the UPE 400a. The UPE 400a generates output data by selecting from the ports 604, 606, and 608 according to the port sequence defined in the slot table 410, and the output data is transmitted through an EHF coupler or wired connection as an output stream. Each of the UPEs 400a through 400d may use different slot tables, and a different EHF coupler (or wired connector) such that the modular virtual pipe I/O 600 provides multiple communication links 616. In the receiver mode of a UPE 400, the configurable crossbar 602 connects the UPE 400 to respective ports 604 through 612 according to the port sequence defined in the slot table of the UPE 400 for output data transmission. Different UPEs 400a through 400d may also perform different types of encryption, decryption, error correction, or other types of processing on the data transmitted through the UPE 400. In the transceiver mode, a UPE 400 may use one or more slot tables to assign the ports 604 through 612 for transmitting or receiving. In some embodiments, one or more of the UPEs 400 may be deactivated or operate in a power saving mode.

Example Device Embodiments

The UPE 400 connects multiple low and high-speed ports from one device to another. The type of port and protocol of the port may vary based on the type of devices. In the example of FIG. 6, the connected devices include a camera control system and a sensor module. The host system of the camera control system may be a system on chip (SoC) and the host system of the sensor module may be a sensor. The ports 604 through 612 facilitate communication between the SoC and the sensor. The ports 604 and 606 are Mobile Industry Processor Interface (MIPI) ports, the port 606 is a camera protocol port, the port 610 is an I2C port, and the port 612 is a GPIO port. The MIPI ports 604 and 606 and the next-generation camera protocol port 608 are examples of high-speed ports, while the I2C port 610, and GPIO port 612 are examples of low-speed ports.

Figure 7:
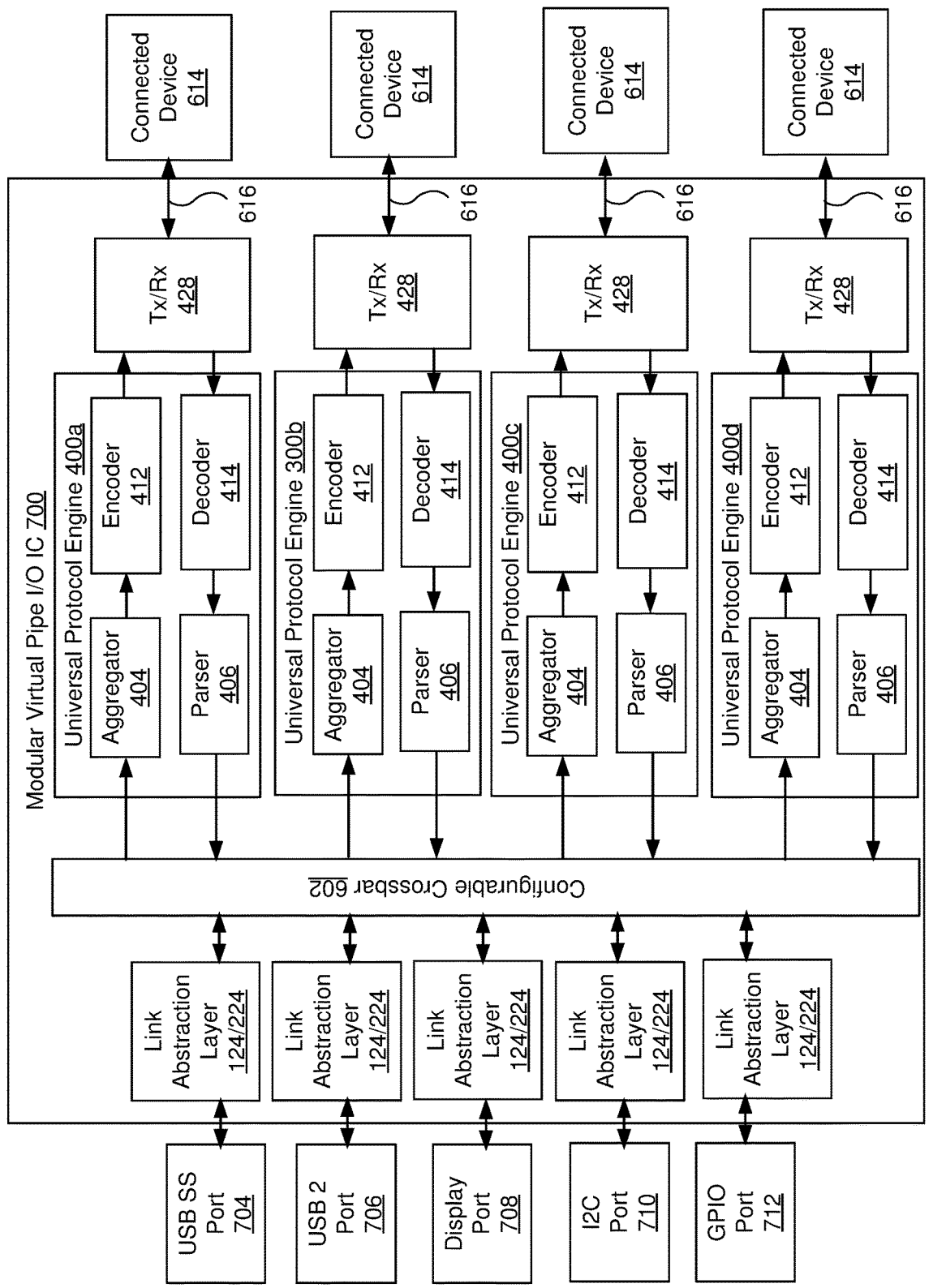

FIG. 7 shows a modular virtual pipe I/O 700, in accordance with some embodiments. The modular virtual pipe I/O 700 can be used in an example where a connected device is a computing device, such as a mobile device or a desktop computer, and another connected device is a peripheral device. The ports 704 through 712 facilitate communication between the computing device and the peripheral device. The port 704 is a Universal Serial Bus (USB) SuperSpeed port, the port 706 is a USB 2.0 port, the port 708 is a DisplayPort port, the port 710 is an I2C port, and the port 712 is a GPIO port. The USB SS port 704, USB 2.0 port 706, and DisplayPort port 708 are examples of high-speed ports, and the I2C port 710 and the GPIO port 712 are examples of low-speed ports.

Figure 8:
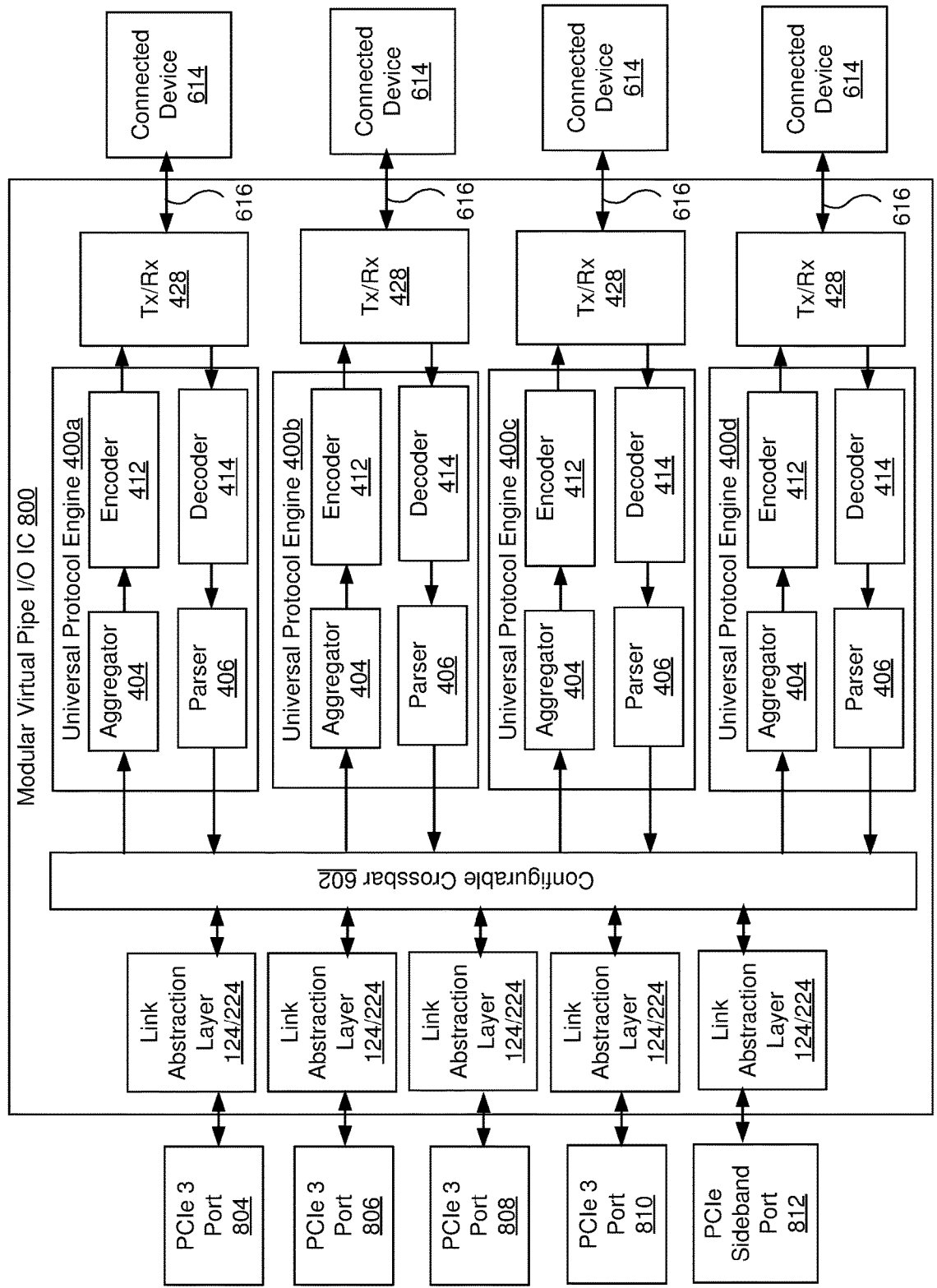

FIG. 8 shows a modular virtual pipe I/O 800, in accordance with some embodiments. The modular virtual pipe 800 can be used in an example where the device 102 and device 104 are servers. The ports 804 through 812 facilitate communication between the servers. The ports 804, 806, 808, and 810 are each a Peripheral Component Interconnect Express (PCIe) 3.0 ports, and the port 812 is a PCIe sideband port. The PCIe 3 ports 804 through 810 are examples of high-speed ports, and PCIe sideband port 812 is an example of a low-speed port.

Virtual Pipe I/O operation

Figure 9:
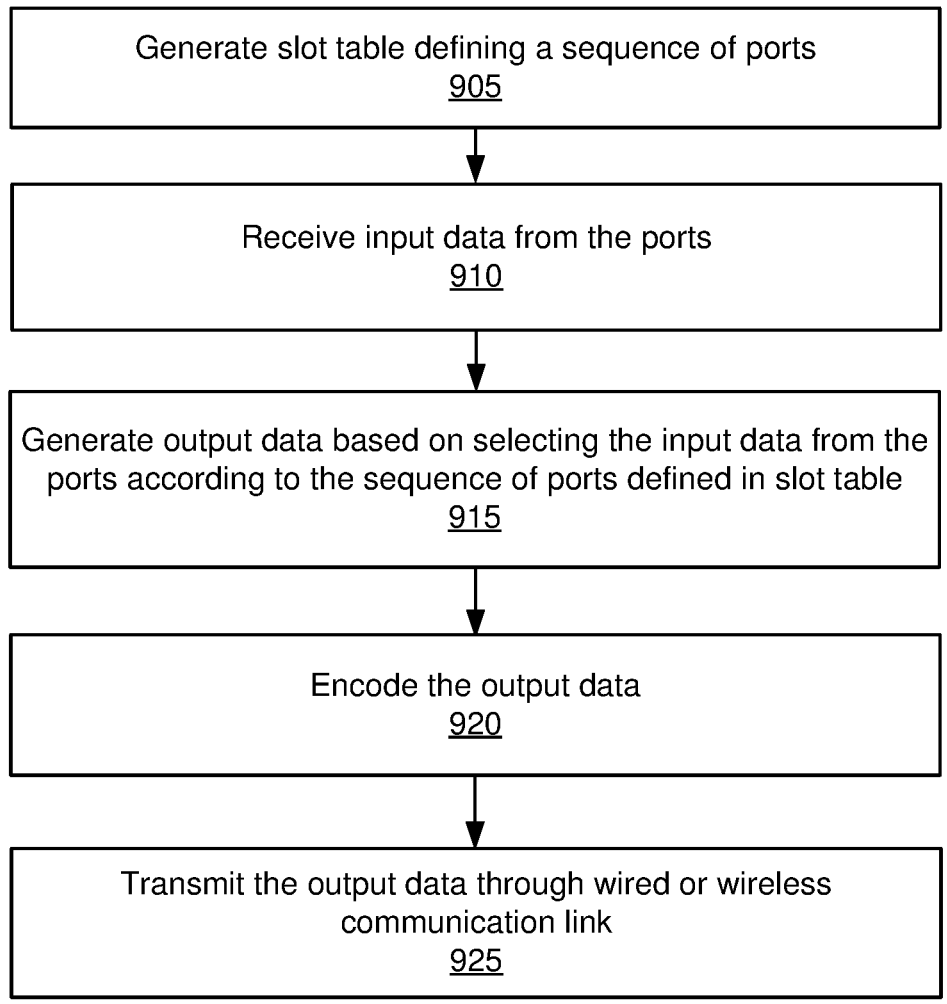
FIG. 9 shows a flow chart of a process for transmitting data according to a slot table of the VPIO, in accordance with some embodiments.

FIG. 9 shows a flow chart of a process 900 for transmitting data according to a slot table, in accordance with some embodiments. The process 900 may include fewer or additional steps, and steps may be in different orders.

A UPE 400 of a virtual pipe I/O or modular virtual pipe I/O generates 905 a slot table 410 defining a sequence of ports. The slot table 410 may be generated based on the demands of the application or transferred data, or properties of the ports such as speed. The slot table 410 may be stored in a memory 408 of the UPE 400. The slot table 410 may be generated by the UPE 400 (e.g., controller 416) or another device. For example, a first device including a UPE may share a slot table 410 with a second device including another UPE so that the first and second devices may communicate according to a universal protocol (i.e., port sequence, encoding, error correction, etc.) that aggregates data of multiple ports. The same slot table 410 is stored in the first and second devices.

The sequence of ports defined by the slot table 410 provides a universal communication protocol that may be different from the communication protocols of the individual ports. The frequency of ports within the sequence of ports may correspond with the relative speed of the ports. For example, a first port may have a higher frequency of selection in the sequence of ports in the slot table than a second port if the first port is a higher speed port than the second port. As such, various types of ports having different speeds can be incorporated within the slot table 410 and the universal communication protocol.

The UPE 400 receives 910 input data from the ports. For example, the controller 416 places the UPE 400 in the transmitter mode or transceiver mode. In the transmitter mode or the transmitting of the transceiver mode, the data buffer 430 receives the input data from the ports, and stores the input data. In some embodiments, the data buffer 430 includes multiple FIFO memories, each memory storing input data from a port.

In some embodiments, the UPE 400 is one of multiple UPEs of a modular virtual pipe I/O 600. Here, the configurable crossbar 602 connects the UPE 400 to one or more of the ports according to the slot table 410 of the UPE 400. The configurable crossbar 602 may perform similar connections for the other UPEs according to their respective slot tables.

The UPE 400 generates 915 output data based on selecting the input data from the ports according to the sequence of ports defined in the slot table 410. The aggregator 404 references the slot table to retrieve the input data from the data buffer 430 according to the sequence of ports defined in the slot table 410. The aggregator 404 may select the input data from multiple FIFO memories of the data buffer 430, each FIFO memory storing input data from a respective port.

For example, the sequence of ports in the slot table indicates one or more of selections of a first port mixed with one or more of selections of a second port. The aggregator selects first data from the first port when the slot table indicates selection of the first port and selects second data from the second port when the slot table indicates selection of the second port to generate the output data according to the sequence of ports. In another example, a slot table may define one or more selections of a first port and zero or more selections of a second port.

In some embodiments, the sequence of ports of the slot table 410 defines a communication protocol for data transmission that is different from one or more communication protocols of the ports. The output data is generated according to the communication protocol by selecting the input data from the ports according to the sequence of the ports defined in the slot table. For example, the ports may include a lower speed port (e.g., GPIO, I2C, etc.) and a higher speed port (e.g., USB, PCIe, etc.). The output data includes input data of the lower speed port mixed with input data of the higher speed port according to the sequence of ports.

The UPE 400 encodes 920 the output data. For example, the programmable encoder 412 performs an encoding, authentication, error correction, or other processing on the output data generated by the aggregator 404. In some embodiments, the output data from the aggregator 404 includes combined input data from multiple ports that use different protocols. The output data uses a universal protocol as defined by the slot table 410 that is different from the protocols of the individual ports. Thus, the type of encoding or processing that can be performed on the output data is not limited by the individual protocols of the ports, and the data from different types of ports may be integrated by the UPE 400.

The UPE 400 transmits 925 the output data through a wired or wireless communication link. For example, the UPE 400 provides the output data to a transmitter, which generates an (e.g., serial) output stream. The transmitter may be integrated with a transceiver, or may be a separate transmitter. The transmitter sends the output stream to an EHF coupler or wired connection that forms the communication link with a UPE 400 of another device.

The process 900 may be repeated. For example, while the output data is being transmitted in step 925, the UPE 400 may update the slot table to define a different sequence of ports. A dynamic adjustment of port assignment to slots of the slot table may be used to generate the updated slot table, which is referenced to generate the output data. The updated slot table may be shared with the other device that receives the output data. In another example, the updated slot table may be generated by the other device and transmitted to the UPE 400.

Figure 10:
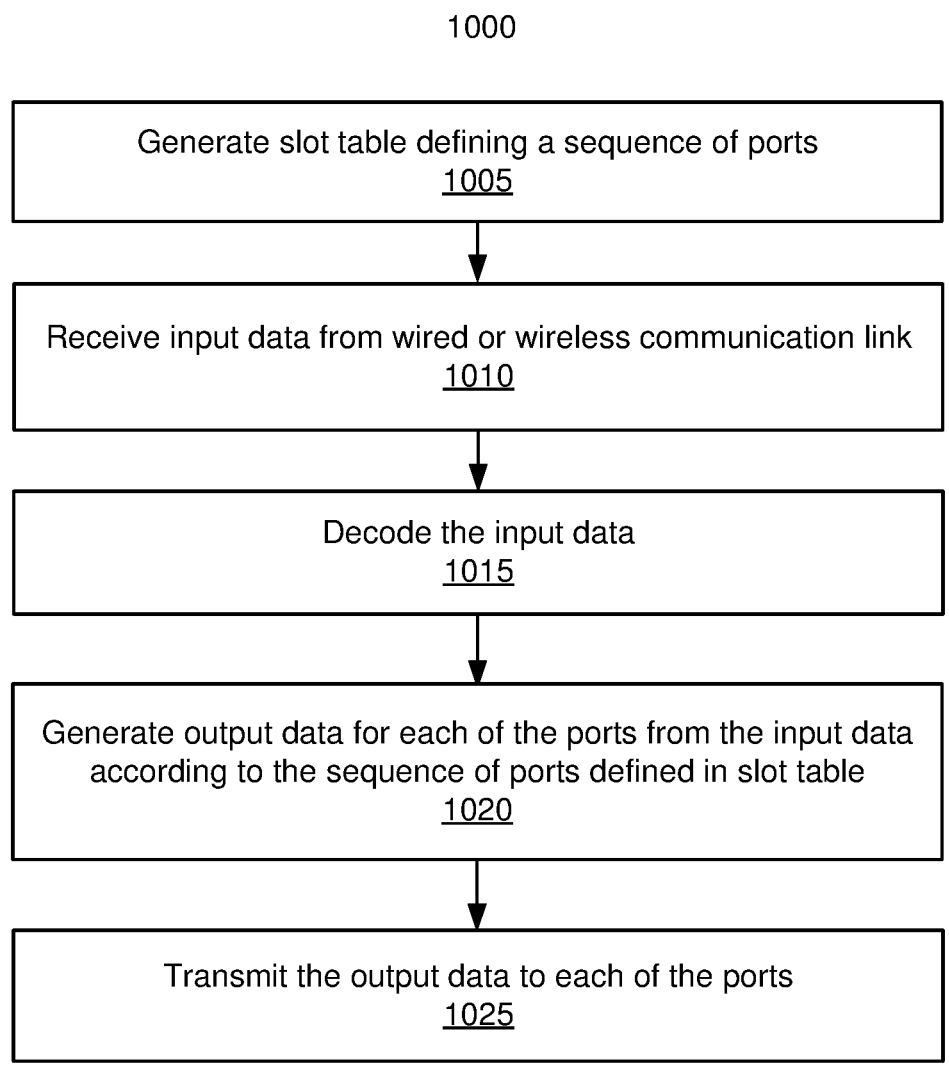
FIG. 10 shows a flow chart of a process for receiving data according to a slot table of the VPIO, in accordance with some embodiments.

FIG. 10 shows a flow chart of a process 1000 for receiving data according to a slot table, in accordance with some embodiments. The process 1000 may include fewer or additional steps, and steps may be in different orders. In some embodiments, a device performs the process 1000 to receive data in connection with another device performing the process 900 to transmit the data.

A UPE 400 of a virtual pipe I/O or modular virtual pipe I/O generates 1005 a slot table 410 defining a sequence of ports. The discussion at 905 of the process 900 may be applicable at step 1005. In the process 1000, the UPE 400 refers to a component of the receiving device rather than the transmitting device. In some embodiments, the UPE 400 receives the slot table 410 from another UPE that operates in the transmitter mode in a calibration process prior to data transfer, or otherwise synchronizes the slot tables 410 on the transmitting and receiving devices.

The UPE 400 receives 1010 input data from the wired or wireless communication link. For example, the controller 416 places the UPE 400 in the receiver mode or the transceiver mode. A receiver receives an input stream from the communication link, and deserializes the input stream to generate the input data. The receiver may be integrated with a transceiver, or may be a receiver that is separate from a transmitter.

The UPE 400 decodes 1015 the input data. The programmable decoder 414 receives the input data from the transceiver, and performs decoding, authentication, error correction, or other processing on the input data. The programmable decoder 414 may apply a processing that reverses the processing applied by the programmable encoder 412 of the transmitting device. For example, the decoding may include converting encoded data by the programmable encoder 412 into the data prior to encoding.

The UPE 400 generates 1020 output data for each of the ports from the input data according to the sequence of ports defined in the slot table 410. For example, the parser 406 references the slot table 410, and parses the input data from the programmable decoder 414 into multiple channels of the output data according to the sequence of ports defined in the slot table 410. The sequence of ports in the slot table indicates one or more selections of ports over time. For example, a parser assigns first data to a first port when the slot table indicates selection of the first port, and assigns second data from a second port when the slot table indicates selection of the second port to generate the output data according to the sequence of ports. The parser 406 may store the output data in the data buffer 432, and the data buffer 432 provides the output data to respective ports. The data buffer 432 may include a FIFO memory for each port. The parser 406 may store output data for each port in a respective FIFO memory for the port.

The UPE 400 transmits 1025 the output data to each of the ports. For example, the FIFO memories of the data buffer 432 are each connected to a port, and provides the output data for the port to the connected port. In some embodiments, the UPE 400 is one of multiple UPEs of a modular virtual pipe I/O 600. Here, the configurable crossbar 602 connects the UPE 400 to one or more of the ports according to the slot table 410 of the UPE 400 to facilitate the transfer of the output data to respective ports. The configurable crossbar 602 may perform similar connecting for the other UPEs according to their respective slot tables.

The process 1000 may be repeated. For example, while the output data is being transmitted to the ports in step 1025, the UPE 400 may update the slot table to define a different sequence of ports. A dynamic adjustment of port assignment to slots of the slot table may be used to generate the updated slot table, which is referenced to generate the output data. The updated slot table may be shared with the other device that sends the input data. In another example, the updated slot table may be generated by the other device and transmitted to the UPE 400.

Programmable Encoder and Decoder

Figure 11A:
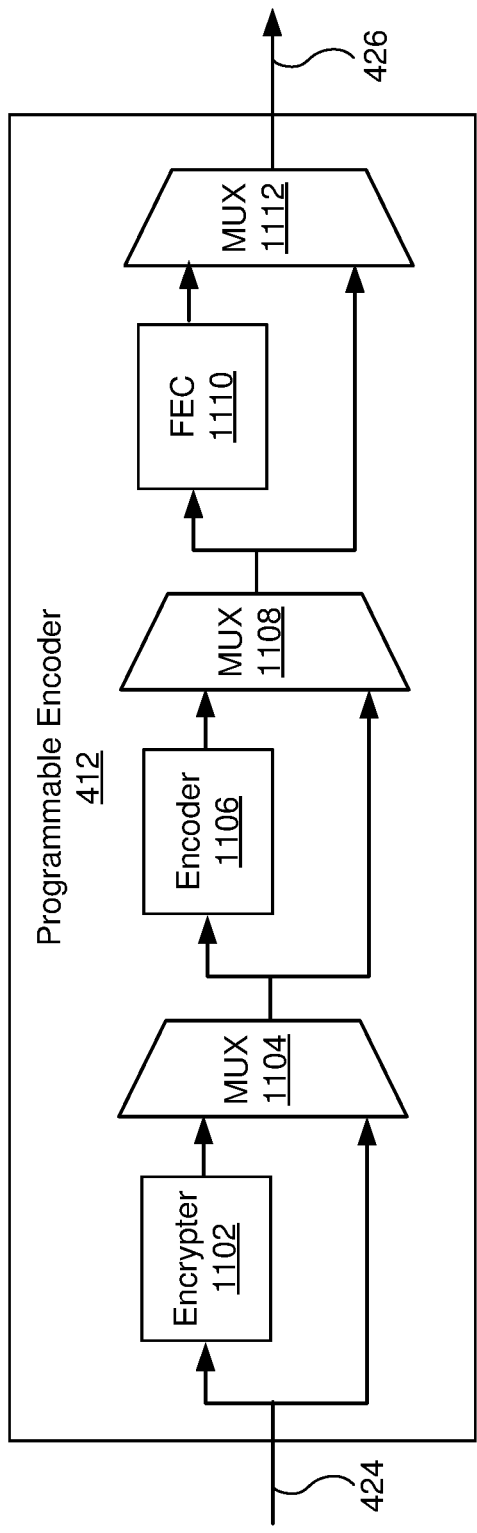
FIG. 11A shows a programmable encoder, in accordance with some embodiments.

FIG. 11A shows a programmable encoder 412, in accordance with some embodiments. The programmable encoder 412 is a component of the UPE 400 that receives the output data 424 from the aggregator 404 and performs processing to generate the output data 426 for the transceiver 428. The programmable encoder 412 provides for selective application of various data processing for transmitted data, such as encrypting, encoding, or forward error correction. The programmable encoder 412 includes an encrypter 1102, a multiplexer (MUX) 1104, an encoder 1106, a MUX 1108, a forward error correction (FEC) 1110, and a MUX 1112.

The MUXes 1104, 1108, and 1112, such as under control of the controller 416, may selectively apply encryption by the encrypter 1102, encoding by the encoder 1106, or error correction by the FEC 1110 to the output data 424. For example, encrypter 1102 receives the output data 424 from the aggregator 404. The output of the encryptor 1102 is connected to the MUX 1104 with the output data 424. The MUX 1104 selects between the output data 424 and the output of the encrypter 1102 as an output. The output of the MUX 1104 is connected to the encoder 1106 and the MUX 1108. The output of the encoder 1106 is connected to the MUX 1108. The MUX 1108 selects between the output of the MUX 1104 and the output of the encoder 1106 as output. The output of the MUX 1108 is connected to the FEC 1110 and the MUX 112. The MUX 1112 selects between output of the FEC 1110 and the MUX 1108 to generate the output data 426. The order of the encryption, encoding, and error correction applied to the output data 424 may be different.

Figure 11B:
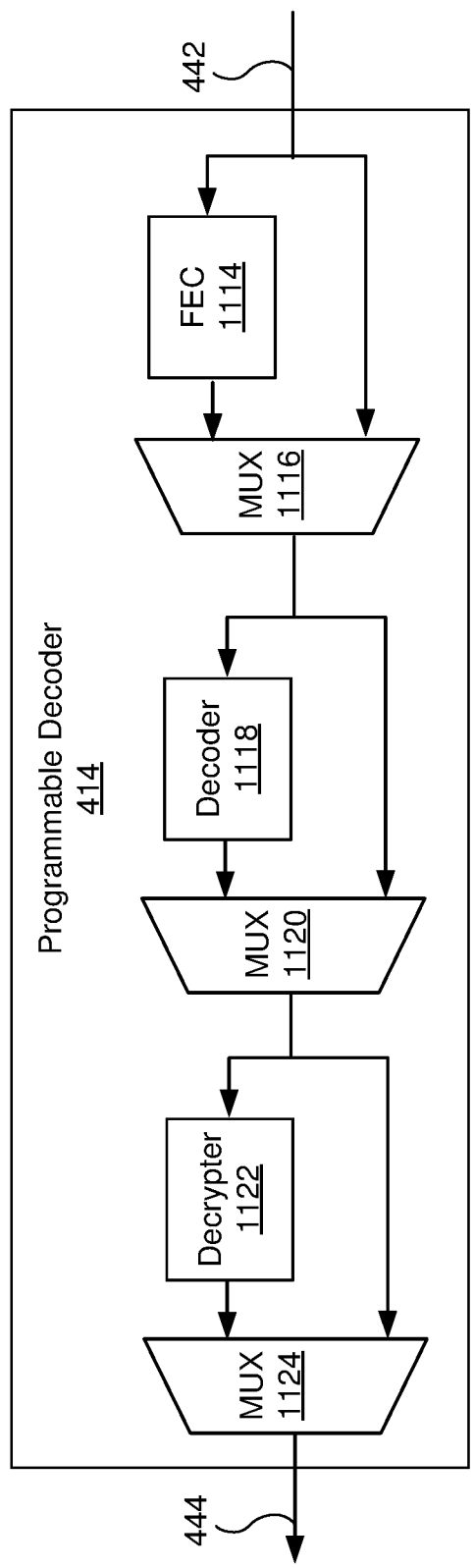
FIG. 11B shows a programmable decoder, in accordance with some embodiments.

FIG. 11B shows a programmable decoder 414, in accordance with some embodiments. The programmable decoder 414 is a component of the UPE 400 that receives the input data 442 from the transceiver 428 and performs processing to generate the input data 444 for the parser 406. The programmable decoder 414 in a device provides for selective application of various data processing, and may correspond with the selected processing used by a programmable encoder 412 of another device connected to the device. The programmable encoder 414 includes a FEC 1114, a MUX 1116, a decoder 1118, a MUX 1120, a decrypter 1122, and a MUX 1124.

The MUXes 1116, 1120, and 1124, such as under control of the controller 416, may selectively apply error correction by the FEC 1114, decoding by the decoder 1118, decrypting by the decrypter 1112 to the input data 442. For example, the FEC 1114 receives the input data 442 from a transceiver 428, and applies forward error correction. The output of the FEC 1114 and the input data 442 is connected to the MUX 1116. The MUX 1116 selects between the input data 442 and the output of the FEC 1114 as an output. The output of the MUX 1116 is connected to the decoder 1118 and the MUX 1120. The output of the decoder 1118 is connected to the MUX 1120. The MUX 1120 selects between the output of the MUX 1116 and the output of the decoder 1118 as the output. The output of the MUX 1120 is connected to the decrypter 1122 and the MUX 1124. The output of the decrypter 1122 is connected to the MUX 1124. The MUX 1124 selects between the output of the MUX 1120 and the output of the decrypter 1122 as the output. The output of the MUX 1124 is the input data 444 for the parser 406. The order of the decryption, decoding, and error correction applied to the output data 442 may be different.

In some embodiments, encoder 1106 and decoder 1118 may include an 8b10b encoder/decoder, a 16b/18b encoder/decoder, or other encoder/decoder (such as 64b/66b, 128b/132b, etc.). The authentication and encryption protocols used by the encrypter 1102 and decrypter 1122 may include High-bandwidth Digital Content Protection (HDCP) authentication and encryption. The error correction applied by the FEC 1110 and FEC 1114 may include DisplayPort forward error correction (FEC). Other types of encoding, decoding, encryption, decryption, and error correction may be used.

Virtual Pipe I/O Controller

Figure 12:
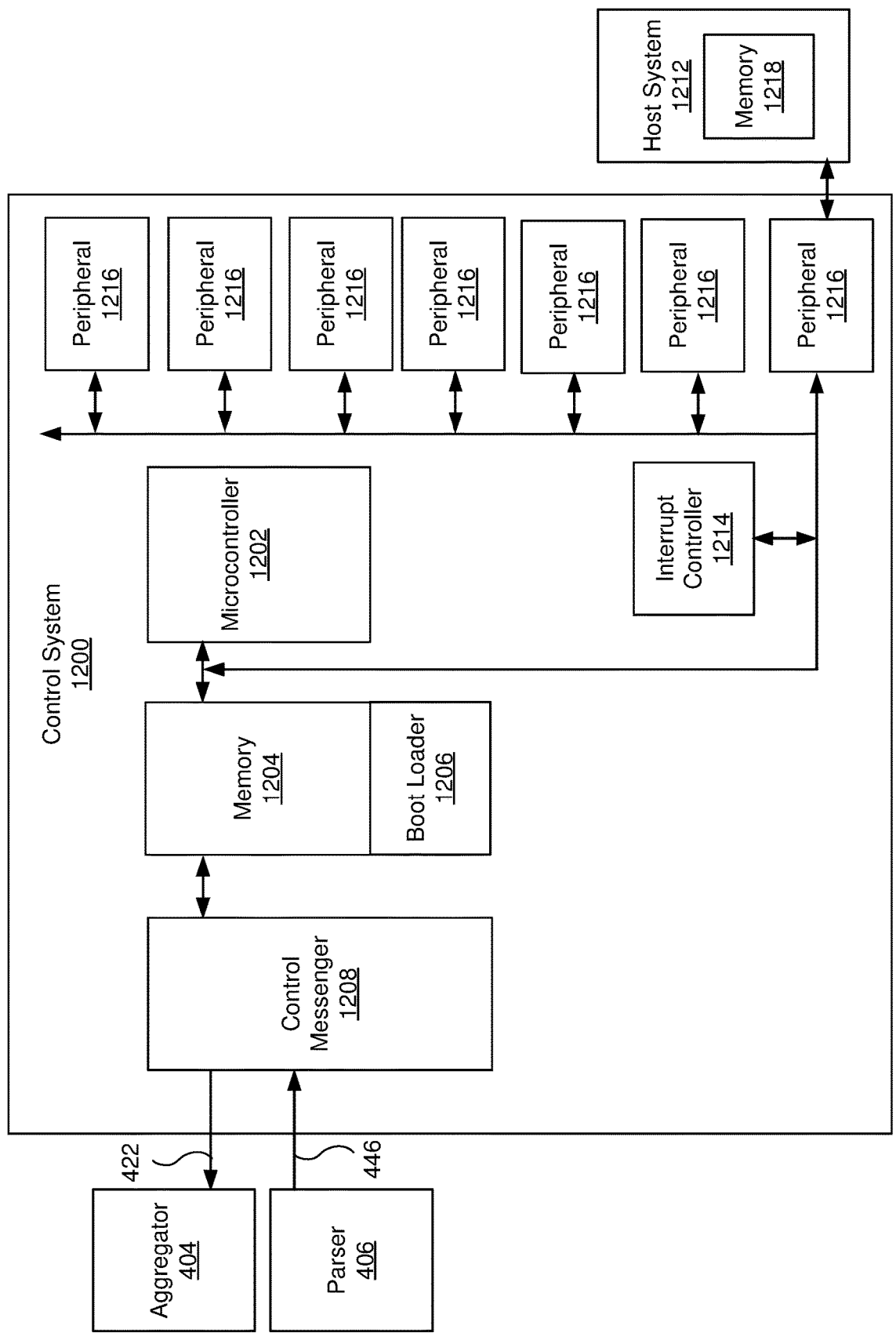
FIG. 12 shows a control system of a universal protocol engine, in accordance with some embodiments.

FIG. 12 shows a control system 1200 of a universal protocol engine, in accordance with some embodiments. The control system 1200 includes a microcontroller 1202, a memory 1204 including a boot loader 1206, a control messenger 1208, an interrupt controller 1214, and multiple peripherals 1216.

In one example, the peripherals 1216 each include ports, such as for I2C, serial peripheral interface (SPI), general-purpose input/output (GPIO), pulse width modulation (PWM), analog-to-digital converter (ADC), and timer-counters.

The microcontroller 1202 controls the functionality of the universal protocol engine, and may be an example of a controller 416 shown in FIG. 4. The memory 1204 stores instructions that programs the microcontroller 1202 and messages from the microcontroller to be delivered by the Control Messenger 1208. The memory 1204 includes the boot loader 1206 that provides start-up programming for microcontroller 1202. The microcontroller 1202 provides direct access to the memory 1204 and memory mapped peripherals 1216 (such to an I2C peripheral port), and provides execution of memory subroutines. The memory 1204 is coupled to the microcontroller 1202 and the control messenger 1208.

The control messenger 1208 is a direct memory access (DMA) peripheral that connects the memory 1204 to the aggregator 404 and the parser 406. The control messenger 1206 retrieves output data 422 from the memory 1204 and provides the output data 422 to the aggregator 404 through data buffer 430. The control messenger retrieves input data 446 from the parser 406 through data buffer 432 and writes the input data 446 to the memory 1204.

The control messenger 1208 provides communication between the microcontrollers 1202 on two linked devices. Messages may be generated and stored in a buffer of the memory 1204 by one microcontroller 1202, and then the control messenger 1208 communicates with another memory 1204 of the other device via a control messenger 1208 of the other device.

The control messenger 1208 may ensure that messages are reliably delivered in order. At least one slot of the slot table 410 used by each of the aggregator 404 and parser 406 may be dedicated to bi-directional messaging between microcontrollers 1202 of connected devices. The speed of the messaging may be controlled based on the allocation of slots in the slot table 410.

In some embodiments, one or more of the peripherals 1216 may be connected to host system 1212.

ADDITIONAL CONFIGURATION INFORMATION

The foregoing description of the embodiments has been presented for the purpose of illustration; it is not intended to be exhaustive or to limit the patent rights to the precise forms disclosed. Persons skilled in the relevant art would appreciate that many modifications and variations are possible in light of the above disclosure.

The scope of the patent rights is not limited by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. An electronic device, comprising:
a universal protocol engine circuit, including:
 a memory configured to store a slot table defining a sequence of ports in which data from one or more communication ports are to be transmitted, each of the communication ports associated with a corresponding communication protocol;
 an aggregator circuit coupled to the memory, the aggregator circuit configured to:
  receive input data from the one or more communication ports according to the corresponding communication protocol; and
  generate output data by selecting the input data from the one or more communication ports according to the sequence of the ports defined in the slot table; and
 a transmitter configured to generate an output stream from the output data and provide the output stream to a wired or wireless coupler for transmission to another electronic device.

2. The electronic device of claim 1, wherein:
the sequence of ports in the slot table indicates one or more selections of a first port mixed with one or more selections of a second port; and
the aggregator circuit selects first data from the first port when the slot table indicates selection of the first port and selects second data from the second port when the slot table indicates selection of the second port to generate the output data according to the sequence of ports.

3. The electronic device of claim 1, wherein a first communication protocol associated with a first port of the one or more communication ports is configured for data communication at a higher speed than a second communication protocol associated with a second port of the one or more communication ports, and the output data includes first input data of the first port mixed with second input data of the second port according to the sequence of ports.

4. The electronic device of claim 1, wherein the universal protocol engine circuit further includes an encoder circuit configured to encode the output data from the aggregator circuit prior to generation of the output stream by the transmitter using the output data.

5. The electronic device of claim 1, wherein the universal protocol engine circuit further includes an encrypter circuit configured to encrypt the output data from the aggregator circuit prior to generation of the output stream by the transmitter using the output data.

6. The electronic device of claim 1, wherein the universal protocol engine circuit further includes an error correction circuit configured to apply error correction to the output data prior to generation of the output stream from the aggregator circuit prior to generation of the output stream by the transmitter using the output data.

7. The electronic device of claim 1, wherein a first communication protocol associated with a first port of the one or more communication ports is configured for data communication at a higher speed than a second communication protocol associated with a second port of the one or more communication ports, and the first port has a higher frequency of selection in the sequence of ports than the second port.

8. The electronic device of claim 1, wherein the universal protocol engine circuit further includes:
a receiver configured to receive an input stream from the wired or wireless coupler and generate other input data from the input stream; and
a parser circuit coupled to the memory and the receiver, the parser circuit configured to:
receive the other input data from the receiver; and
generate other output data for each of the one or more communication ports from the other input data according to the sequence of the ports defined in the slot table or another sequence of the ports defined in another slot table stored in the memory.

9. The electronic device of claim 8, wherein:
the sequence of ports defined in the slot table or the other sequence of ports defined in the other slot table indicates one or more selections of a first port mixed with one or more selections of a second port; and
the parser circuit assigns first data to the first port when the slot table indicates selection of the first port and assigns second data to the second port when the slot table indicates selection of the second port to generate the other output data according to the sequence of ports.

10. The electronic device of claim 8, wherein the universal protocol engine circuit further includes a decoder circuit configured to decode the other input data from the receiver prior to generation of the other output data by the parser circuit using the other input data.

11. The electronic device of claim 8, wherein the universal protocol engine circuit further includes a decrypter circuit configured to decrypt the other input data from the receiver prior to generation of the other output data by the parser circuit using the other input data.

12. The electronic device of claim 8, wherein the universal protocol engine circuit further includes an error correction circuit configured to apply error correction to the other input data from the receiver prior to generation of the other output data by the parser circuit using the other input data.

13. The electronic device of claim 1, further comprising:
another universal protocol engine circuit configured to transfer data through another wired or wireless coupler according to another sequence of ports stored in another slot table; and
a configurable crossbar coupled to the one or more communication ports, the universal protocol engine circuit and the other universal protocol engine circuit, the configurable crossbar configured to:
connect at least one of the one or more communication ports to the universal protocol engine circuit according to the slot table; and
connect at least another one of the one or more communication ports to the other universal protocol engine circuit according to the other slot table.

14. The electronic device of claim 13, wherein the universal protocol engine circuit operates in a transmitter mode in parallel with the other universal protocol engine circuit operating in a receiver mode.

15. The electronic device of claim 1, further comprising a circuit board including:
a processor configured to generate the input data and provide the input data to the universal protocol engine circuit via the one or more communication ports; and
the universal protocol engine circuit, wherein the universal protocol engine circuit further includes virtual contactless physical layers (VcPHYs) configured to receive the input data from the one or more communication ports.

16. The electronic device of claim 1, further comprising:
a first circuit board including a processor configured to generate the input data and provide the input data to the universal protocol engine circuit via the one or more communication ports; and
a second circuit board including the universal protocol engine circuit, wherein the universal protocol engine circuit further includes physical layers (PHYs) configured to receive the input data from the one or more communication ports.

17. The electronic device of claim 1, wherein the coupler is a wireless extremely high frequency (EHF) coupler.

18. An electronic device, comprising:
a universal protocol engine circuit, including:
a memory configured to store a slot table defining a sequence of ports in which data received from another electronic device are to be provided to one or more communication ports, each of the communication ports associated with a corresponding communication protocol;
a receiver configured to receive an input stream from the other electronic device via a wired or wireless coupler and generate input data from the input stream;
a parser circuit coupled to the receiver and the memory, the parser circuit configured to:
receive the input data from the receiver; and
generate output data for each of the one or more communication ports by parsing the input data according to the sequence of the ports defined in the slot table; and
provide the output data to the one or more communication ports according to the corresponding communication protocol.

19. The electronic device of claim 18, wherein:
the sequence of ports in the slot table indicates one or more selections of a first port mixed with one or more selections of a second port; and the parser circuit assigns first data to the first port when the slot table indicates selection of the first port and assigns second data to the second port when the slot table indicates selection of the second port to generate the output data to be provided to the one or more communication ports according to the sequence of ports.

20. The electronic device of claim 18, wherein the one or more communication ports include a higher speed port and a lower speed port, and the input data includes output data for the lower speed port mixed with output data for the higher speed port according to the sequence of ports.

21. The electronic device of claim 18, further comprising a decoder circuit configured to decode the input data from the receiver prior to the parser circuit generating the output data.

22. The electronic device of claim 18, further comprising a decrypter circuit configured to decrypt the input data from the receiver prior to the parser circuit generating the output data.

23. The electronic device of claim 18, further comprising an error correction circuit configured to apply error correction to the input data from the receiver prior to the parser circuit generating the output data.

24. The electronic device of claim 18, wherein a first communication protocol associated with a first port of the one or more communication ports is configured for data communication at a higher speed than a second communication protocol associated with a second port of the one or more communication ports, and the first port has a higher frequency of selection in the sequence of ports than the second port.

25. The electronic device of claim 18, further comprising:
another universal protocol engine circuit configured to transfer data through another wired or wireless coupler according to another sequence of ports stored in another slot table; and
a configurable crossbar coupled to the one or more communication ports, the universal protocol engine circuit and the other universal protocol engine circuit, the configurable crossbar configured to:
connect at least one of the one or more communication ports to the universal protocol engine circuit according to the slot table; and
connect at least another one of the one or more communication ports to the other universal protocol engine circuit according to the other slot table.

26. A method, comprising, by an electronic device:
storing a slot table defining a sequence of ports in which data from a plurality of communication ports are to be transmitted, each of the communication ports associated with a corresponding communication protocol;
receiving input data from the plurality of communication ports according to the corresponding communication protocol;
generating output data by selecting the input data from the plurality of communication ports according to the sequence of the ports defined in the slot table;
generating an output stream from the output data; and
providing the output stream to a wired or wireless coupler of the electronic device.

27. A method, comprising, by an electronic device:
storing a slot table defining a sequence of ports in which data received from another electronic device are to be provided to a plurality of communication ports, each of the communication ports associated with a corresponding communication protocol;
receiving input data from a wired or wireless coupler of the electronic device;
generating output data for each of the plurality of communication ports from the input data according to the sequence of the ports defined in the slot table; and
providing the output data to the plurality of communication ports according to the corresponding communication protocol.

\* \* \* \* \*